(12) United States Patent
Driscoll et al.

(10) Patent No.: US 8,938,608 B2
(45) Date of Patent: *Jan. 20, 2015

(54) ENABLING PORTIONS OF PROGRAMS TO BE EXECUTED ON SYSTEM Z INTEGRATED INFORMATION PROCESSOR (ZIIP) WITHOUT REQUIRING PROGRAMS TO BE ENTIRELY RESTRUCTURED

(75) Inventors: Wayne E. Driscoll, Westmont, IL (US); Paul E. Kenney, Manvel, TX (US); Ben P. Marino, Colorado Springs, CO (US); Hong Zhou, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/410,136

(22) Filed: Mar. 1, 2012

(65) Prior Publication Data

US 2013/0031352 A1 Jan. 31, 2013

Related U.S. Application Data

(63) Continuation of application No. 13/193,761, filed on Jul. 29, 2011.

(51) Int. Cl.
*G06F 9/44* (2006.01)
*G06F 9/46* (2006.01)

(52) U.S. Cl.
CPC ........................................ *G06F 9/46* (2013.01)
USPC ........................................... 712/229; 712/244

(58) Field of Classification Search
CPC ........................................................ G06F 9/46
USPC ................................................. 712/229, 244
See application file for complete search history.

(56) References Cited

U.S. PATENT DOCUMENTS 5,740,437 A 4/1998 Greenspan et al.
6,430,674 B1 8/2002 Trivedi et al.
(Continued)

OTHER PUBLICATIONS

Morrison, "How Can You zIIP? Getting More From Your zIIP Engines", Jan. 2008, http://www.ca.com/us/~/media/files/whitepapers/ziip_exploitation_wp3.aspx, downloaded Jan. 3, 2014, 9 pages.*

(Continued)

*Primary Examiner* — Andrew Caldwell
*Assistant Examiner* — Yuqing Xiao
(74) *Attorney, Agent, or Firm* — Robert A. Voigt, Jr.; Winstead, P.C.

(57) ABSTRACT

A method for allowing portions of programs to be executed on a System z Integrated Information Processor (zIIP). A service call is inserted at the beginning of the zIIP eligible code to enable enclave Service Request Block (SRB)-mode execution on the zIIP processor. An additional service call is inserted at the end of the zIIP eligible code to disable the enclave SRB-mode execution. A module in the operating system, referred to herein as the "zIIP shifter module," is configured to detect these service calls thereby implementing and terminating the SRB-mode execution so that the zIIP processor executes the zIIP eligible code for the appropriate duration of time. In this manner, only a portion of the programs that contain eligible zIIP executable code is executed on the zIIP processor without requiring the programs to be entirely restructured thereby reducing development cost and improving software development productivity.

5 Claims, 3 Drawing Sheets

(56) References Cited

U.S. PATENT DOCUMENTS

| | | | |
|---|---|---|---|
| 7,047,394 | B1 | 5/2006 | Van Dyke et al. |
| 2006/0149927 | A1 | 7/2006 | Dagan et al. |
| 2008/0059769 | A1 | 3/2008 | Rymarczyk et al. |
| 2011/0072432 | A1 | 3/2011 | Laviolette |
| 2011/0072433 | A1 | 3/2011 | Laviolette |

OTHER PUBLICATIONS

IBM, "Programming Interface for simplifying the exploitation of zIIP processors by z/OS software programs", May 27, 2009, IBM Techinical Disclosures, http://ip.com/IPCOM/000183568, downloaded Jan. 3, 2014, 3 pages.*

Office Action for U.S. Appl. No. 13/193,761 dated May 1, 2014, pp. 1-22.

Mullins, "Just the Facts About Mainframe Specialty Processors," The Data Administration Newsletter, http://www.tdan.com/view-articles/11902, Nov. 1, 2009, pp. 1-4.

Office Action for U.S. Appl. No. 13/193,761 dated Jan. 15, 2014, pp. 1-15.

Peter Morrison, "How Can You zIIP? Getting More From Your zIIP Engines," http://www.ca.com/us/-/media/files/whitepapers/ziip_exploitation_wp3.aspx, downloaded Jan. 3, 2014, 9 pages.

IBM, "Programming Interface for Simplifying the Exploitation of zIIP Processors by z/OS Software Programs," IBM Technical Disclosure, http://ip.com/IPCOM/000183568, IPCOM000183568D, May 27, 2009, 3 pages.

* cited by examiner

ENABLING PORTIONS OF PROGRAMS TO BE EXECUTED ON SYSTEM Z INTEGRATED INFORMATION PROCESSOR (ZIIP) WITHOUT REQUIRING PROGRAMS TO BE ENTIRELY RESTRUCTURED

CROSS-REFERENCE TO RELATED APPLICATIONS

The present application is a continuation application of pending U.S. patent application Ser. No. 13/193,761, which was filed on Jul. 29, 2011, which is assigned to the assignee of the present invention. The present application claims priority benefits to U.S. patent application Ser. No. 13/193,761.

TECHNICAL FIELD

The present invention relates to mainframe computers, and more particularly to enabling portions of programs to be executed on a System z Integrated Information Processor (zIIP) without requiring the programs to be restructured entirely.

BACKGROUND

Mainframe computers are powerful computers used mainly by large organizations for critical applications, typically bulk data processing, such as census, industry and consumer statistics, enterprise resource planning, financial transaction processing, etc. One popular mainframe computer is IBM® zSeries® mainframe computer. The zSeries® mainframe computer may include a plurality of processing units, including one or more general purpose processors and one or more special purpose processors, commonly referred to as z Integrated Information Processors (zIIPs). The zIIP processor is a special processor intended to offload the general processor of the mainframe computer system. These processors do not contain microcode or hardware features that accelerate their designated workload. Instead, they are financially different in that they perform increasing system capacity for targeted workloads without raising the operating system (e.g., z/OS® which is the operating system for mainframe computers produced by IBM®) and/or third party software license fees as would be the case if the workload was performed by the general processor.

While there is a desire to run code on a zIIP processor to take advantage of the increased speed and reduced license fees (if any fee applies), only enclave Service Request Block (SRB) mode code can run on zIIP processors. There are currently two types of workload, sometimes referred to as units of work (UOW), in the operating system of the zSeries® mainframe (z/OS®). These two types of workload are referred to as SRB and Task Control Block (TCB). Typically, about ten percent of the workload in a mainframe computer system is SRB with the remaining ninety percent being TCB. An enclave is a logical collection of various UOWs (TCBs and/or SRBs) represented by one or more enclave control blocks.

A general processor of the mainframe computer system is available to run all workloads (e.g., TCB or SRB) while the z/OS® operating system will only run enclave SRB type workloads on a zIIP processor. Additionally, the z/OS® operating system will only consider SRBs that are part of an enclave and only enclaves that conform to IBM's® propriety interface to be eligible for zIIP execution.

Currently, in order for programs to be used by the zIIP processor, including only a portion of the programs that contain eligible zIIP executable code, the programs have to be designed to be executed on the zIIP processor in their entirety. This approach involves restructuring the entire program code which requires knowledge of the difficult to use SRB-mode programming interfaces of the z/OS® operating system. Additionally, the restructuring process requires intensive regression testing which results in additional development cost as well as possibly introducing programming bugs that could negatively impact consumer satisfaction.

If, however, programs did not have to be entirely restructured in order for portions of its eligible zIIP executable code to be executed on the zIIP processor, then the development cost is reduced and software development productivity is improved.

BRIEF SUMMARY

In one embodiment of the present invention, a method for allowing portions of programs to be executed on a special purpose processor comprises implementing a first mode of operation in response to detecting a first service call at a beginning of eligible code that is executable on the special purpose processor. The method further comprises terminating, by a processor, the first mode of operation in response to detecting a second service call at an end of the eligible code that is executable on the special purpose processor.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for allowing portions of programs to be executed on a System z Integrated Information Processor (zIIP). In one embodiment of the present invention, a service call is inserted at the beginning of the zIIP eligible code over a span of programs to enable enclave Service Request Block (SRB)-mode execution on the zIIP processor. An additional service call is inserted at the end of the zIIP eligible code to disable the enclave SRB-mode execution on the zIIP processor. A module in the operating system, referred to herein as the "zIIP shifter module," is configured to detect these service calls thereby implementing and terminating the SRB-mode execution so that the zIIP processor executes the zIIP eligible code for the appropriate duration of time. In this manner, only a portion of the programs that contain eligible zIIP executable code is executed on the zIIP processor without requiring the programs to be entirely restructured thereby reducing development cost and improving software development productivity.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
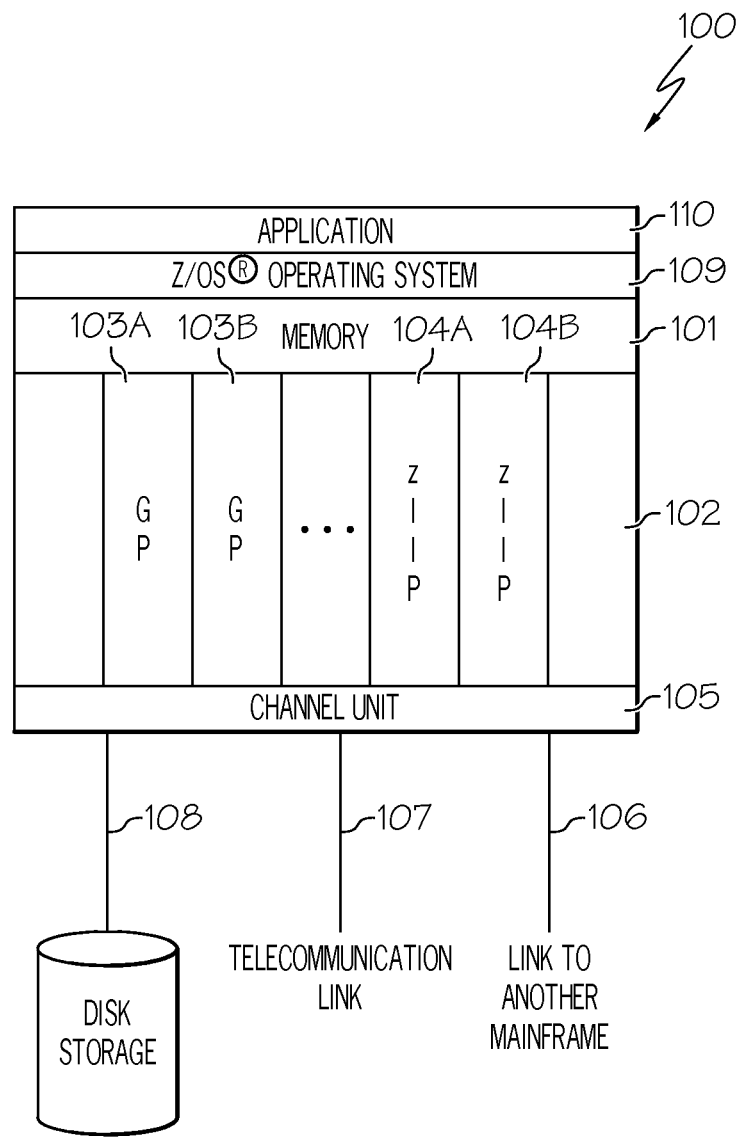
FIG. 1 illustrates an embodiment of the present invention of a mainframe computer system.

Referring now to the Figures in detail, FIG. 1 illustrates a mainframe computer system 100 (e.g., IBM® zSeries® mainframe computer) for practicing the principles of the present invention in accordance with an embodiment of the present invention. Mainframe computer 100 includes memory 101 (e.g., Read Only Memory (ROM), Random Access Memory (RAM)), a processor frame 102, a plurality of General Processors (GPs) 103A-103B and a plurality of System z Integrated Information Processors (zIIPs) 104A-104B within processor frame 102, a channel unit 105 for processing Input/Output (I/O) requests, a connection to another mainframe 106 (which may be a network interface or some other communication link such as a communication bus), a telecommunications link 107 and a disk storage device 108 sometimes referred to as Direct Access Storage Device (DASD). General processors 103A-103B may collectively or individually be referred to as general processors 103 or general processor 103, respectively. Furthermore, zIIP processors 104A-104B may collectively or individually be referred to as zIIP processors 104 or zIIP processor 104, respectively.

zIIP processor 104 is a special purpose processor intended to offload the general processor 103 of mainframe computer system 100. zIIP processors 104 do not contain microcode or hardware features that accelerate their designated workload. Instead, they are financially different in that they permit increasing system capacity for targeted workloads without raising z/OS® and/or third party software license fees as would be the case if this workload was performed by general processor 103.

Mainframe computer system 100 further includes an operating system 109, such as the z/OS® operating system for the zSeries® mainframe computer. A more detailed description of operating system 109 is provided below in connection with FIG. 2. In addition, mainframe computer system 100 includes an application 110 that contains eligible zIIP executable code. Application 110, which may be a single program or a span of multiple programs, does not need to be entirely restructured in order for its eligible zIIP executable code to be executed on zIIP processor 104 as discussed in greater detail further below. It is noted that software components including operating system 109 and application 110 may be loaded into RAM 101, which may be mainframe computer system's 100 main memory for execution.

While FIG. 1 illustrates mainframe computer system 100 including two general processors 103 and two zIIP processors 104, mainframe computer system 100 may include any number of general processors 103 and zIIP processors 104. Furthermore, mainframe computer system 100 is not to be limited in scope to any one particular architecture. For example, a single physical mainframe 100 may also be subdivided into multiple Logical Partitions (LPARs). A LPAR is a logical segmentation of a mainframe's memory and other resources that allows it to run its own copy of an operating system and associated applications. LPARs may be enabled via special hardware circuits or purely through software. LPARs may also allow multiple system images (of the same operating system or different operating systems) to run in one machine. Furthermore, each LPAR can execute one or more subsystems within an operating system. A subsystem is a service provider that performs one or more functions, but does nothing until it is requested. Examples of mainframe subsystems include Customer Information Control System (CICS), Information Management System (IMS), Resource Access Control Facility (RACF). When an LPAR is configured, a system administrator may designate which physical hardware resources are available, either in whole or in part, to that particular LPAR.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module' or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, in order for programs to be used by the zIIP processor, including only a portion of the programs that contain eligible zIIP executable code, the programs have to be designed to be executed on the zIIP processor in their entirety. This approach involves restructuring the entire program code which requires knowledge of the difficult to use SRB-mode programming interfaces of the z/OS® operating system. Additionally, the restructuring process requires intensive regression testing which results in additional development cost as well as possibly introducing programming bugs that could negatively impact consumer satisfaction. If, however, programs did not have to be entirely restructured in order for portions of its eligible zIIP executable code to be executed on the zIIP processor, then the development cost is reduced and software development productivity is improved.

Figure 2:
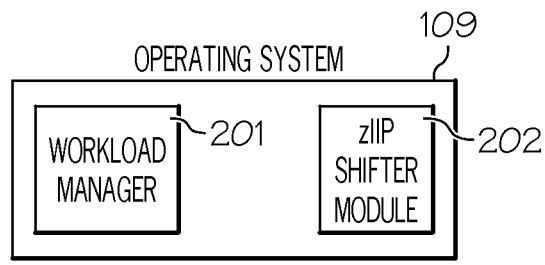
FIG. 2 illustrates the software components of an operating system used in connection with allowing the eligible zIIP executable code to be executed on a zIIP processor in accordance with an embodiment of the present invention.
Figure 3:
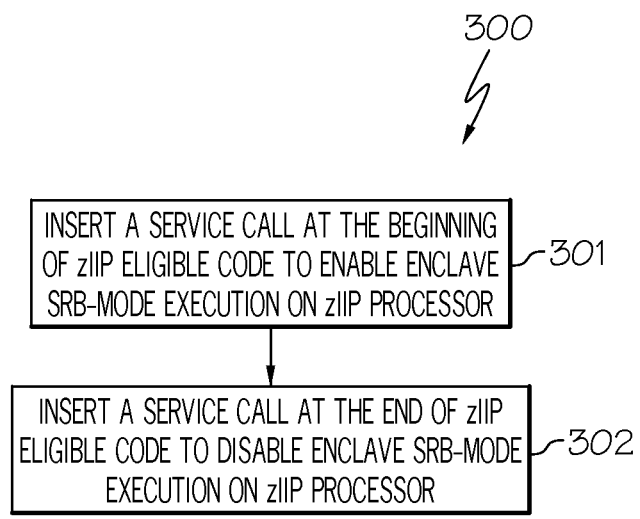
FIG. 3 is a flowchart of a method for inserting calls at strategic locations across a span of programs to identify the eligible zIIP executable code in accordance with an embodiment of the present invention.
Figure 4:
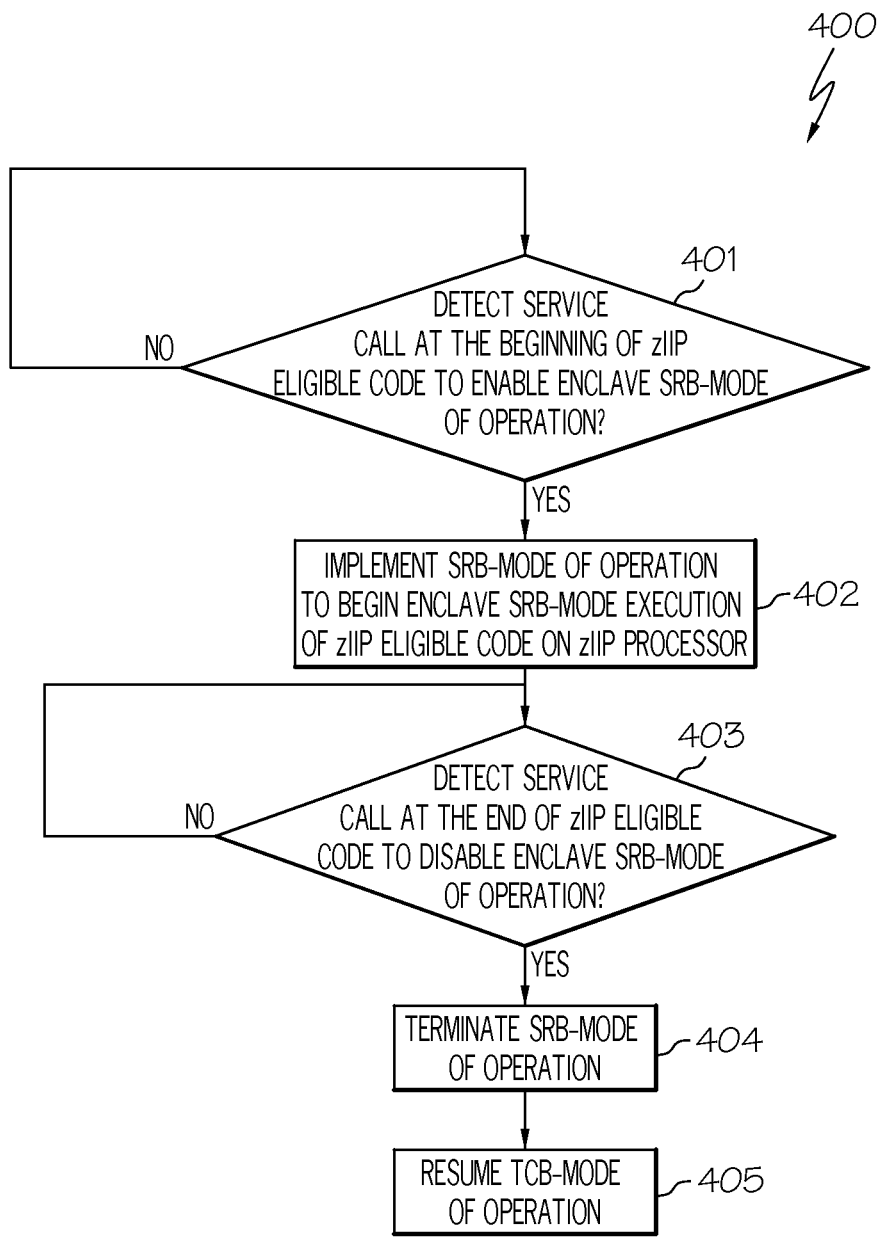
FIG. 4 is a flowchart of a method for allowing portions of programs to run on a zIIP processor without requiring the programs to be entirely restructured in accordance with an embodiment of the present invention.

The principles of the present invention provide a mechanism whereby a program or a span of programs containing eligible zIIP executable code can be executed on the zIIP processor without having to restructure the entire program(s) as discussed below in connection with FIGS. 2-4. FIG. 2 illustrates the software components of operating system 109 (FIG. 1) used in connection with allowing the eligible zIIP executable code to be executed on zIIP processor 104 (FIG. 1) without having to restructure the programs entirely. FIG. 3 is a flowchart of a method for inserting calls at strategic locations in a program or over a span of programs to identify the zIIP eligible code. FIG. 4 is a flowchart of a method for allowing portions of a program or a span of programs to run on zIIP processor 104 (FIG. 1) without requiring the program (s) to be entirely restructured.

While the following discusses allowing portions of a span of programs containing zIIP eligible code to be executed on the zIIP processor without restructuring the programs in their entirety, the principles of the present invention may be applied to allowing portions of a single program containing zIIP eligible code to be executed on the zIIP processor without restructuring the program in its entirety.

As stated above, FIG. 2 illustrates the software components of operating system 109 (FIG. 1) used in connection with allowing the eligible zIIP executable code to be executed on zIIP processor 104 (FIG. 1) without having to restructure the programs entirely in accordance with an embodiment of the present invention.

Referring to FIG. 2, in conjunction with FIG. 1, operating system 109 includes a workload manager component 201. Workload manager 201 controls the system resources. In one embodiment, workload manager 201 is a large oversight program that, inter alia, introduces the capability of dynamically allocating or redistributing server resources across a set of workloads based on user-defined goals and the resource demands. Workload manager 201 allows an end user to classify work running on operating system 201 in distinct service classes and defines goals for them which express the expectation how the work should perform.

Operating system 201 further includes a module, referred to herein as the "zIIP shifter module 202." zIIP shifter module 202 is configured to allow portions of the span of programs, such as application 110, to run on a zIIP processor 104 without requiring the programs to be entirely restructured as discussed further below in connection with FIGS. 3-4.

FIG. 3 is a flowchart of a method for inserting calls at strategic locations across the span of programs (e.g., application 110) to identify the zIIP eligible code thereby allowing zIIP shifter module 202 (FIG. 2) to allow the zIIP eligible code to be executed on zIIP processor 104 (FIG. 1) without requiring the programs to be entirely restructured in accordance with an embodiment of the present invention.

Referring to FIG. 3, in conjunction with FIGS. 1-2, in step 301, a service call is inserted at the beginning of the zIIP eligible code in the span of programs (e.g., application 110) to enable the enclave SRB-mode execution on zIIP processor 104. As discussed above, there are currently two types of workload, sometimes referred to as units of work (UOW), in operating system 109 of zSeries® mainframe z/OS®. These two types of workload are referred to as the Service Request Block (SRB) and the Task Control Block (TCB). z/OS® operating system 109 will only run enclave SRB type workloads on zIIP processor 104. Additionally, z/OS® operating system 109 will only consider SRBs that are part of an enclave (logical collection of various UOWs (TCBs and/or SRBs) represented by one or more enclave control blocks) and only enclaves that conform to IBM's® propriety interface to be eligible for zIIP execution. As a result, it is important to identify the start of zIIP eligible code to enable the enclave SRB-mode execution on zIIP processor 104.

In step 302, a service call is inserted at the end of the zIIP eligible code in the span of programs (e.g., application 110) to disable the enclave SRB-mode execution on zIIP processor 104.

By inserting service calls to indicate the beginning and end of the zIIP eligible code across the span of programs (e.g., application 110), the zIIP eligible code can be executed on zIIP processor 104 without the need for restructuring the programs in their entirety as discussed further below in connection with FIG. 4.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

As stated above, FIG. 4 is flowchart of a method for allowing portions of a span of programs to run on a zIIP processor 104 (FIG. 1) without requiring the programs to be entirely restructured in accordance with an embodiment of the present invention.

Referring to FIG. 4, in conjunction with FIGS. 1-2, in step 401, a determination is made by zIIP shifter module 202 as to whether it detects the service call at the beginning of the zIIP eligible code in the span of programs (e.g., application 110) to enable the enclave SRB-mode of operation. In one embodiment, the mode of operation prior to detecting the service call at the beginning of the zIIP eligible code is the TCB-mode of operation.

If zIIP shifter module 202 does not detect the service call at the beginning of the zIIP eligible code in the span of programs to enable the enclave SRB-mode of operation, then zIIP shifter module 202 continues to determine if it detects the service call at the beginning of the zIIP eligible code in the span of programs to enable the enclave SRB-mode of operation in step 401.

If, however, zIIP shifter module 202 detects the service call at the beginning of the zIIP eligible code in the span of programs (e.g., application 110) to enable the enclave SRB-mode of operation, then, in step 402, zIIP shifter module 202 implements the SRB-mode of operation to begin the enclave SRB-mode execution of the zIIP eligible code on zIIP processor 104.

In step 403, a determination is made by zIIP shifter module 202 as to whether it detects the service call at the end of the zIIP eligible code in the span of programs (e.g., application 110) to disable the enclave SRB-mode of operation. If zIIP shifter module 202 does not detect the service call at the end of the zIIP eligible code in the span of programs to disable the enclave SRB-mode of operation, then zIIP shifter module 202 continues to determine if it detects the service call at the end of the zIIP eligible code in the span of programs (e.g., application 110) to disable the enclave SRB-mode of operation in step 403.

If, however, zIIP shifter module 202 detects the service call at the end of the zIIP eligible code in the span of programs (e.g., application 110) to disable the enclave SRB-mode of operation, then, in step 404, zIIP shifter module 202 terminates the SRB-mode of operation. In step 405, zIIP shifter module 202 resumes the TCB-mode of operation.

In this manner, only a portion of the span of programs that contains eligible zIIP executable code is executed on zIIP processor 104 without requiring the programs to be entirely restructured thereby reducing development cost and improving software development productivity.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for allowing portions of programs to be executed on a System z Integrated Information Processor (zIIP), the method comprising:
   implementing a first mode of operation in response to detecting a first service call at a beginning of eligible code that is executable on said zIIP processor, wherein said first mode of operation comprises a service request block mode of operation; and
   terminating, by a processor, said first mode of operation in response to detecting a second service call at an end of said eligible code that is executable on said zIIP processor.

2. The method as recited in claim 1 further comprising:
   resuming a second mode of operation in response to detecting said second service call at said end of said eligible code.

3. The method as recited in claim 2, wherein said second mode of operation comprises a task control block mode of operation.

4. The method as recited in claim 1, wherein said beginning of said eligible code and said end of said eligible code spans across a plurality of programs.

5. The method as recited in claim 1, wherein said eligible code comprises System z Integrated Information Processor (zIIP) eligible code.

* * * * *